(12) United States Patent
Kawata et al.

(10) Patent No.: US 9,928,325 B2
(45) Date of Patent: Mar. 27, 2018

(54) INFORMATION PROCESSING DEVICE AND WAVEFORM VERIFICATION METHOD

(71) Applicant: FUJITSU LIMITED, Kawasaki-shi, Kanagawa (JP)

(72) Inventors: Hikoyuki Kawata, Kawasaki (JP); Masaki Tosaka, Kawasaki (JP); Kumiko Teramae, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/133,368

(22) Filed: Apr. 20, 2016

(65) Prior Publication Data
US 2016/0335382 A1 Nov. 17, 2016

(30) Foreign Application Priority Data
May 14, 2015 (JP) .................................. 2015-098819

(51) Int. Cl.
*H02J 7/00* (2006.01)
*G06F 17/50* (2006.01)

(52) U.S. Cl.
CPC ...... *G06F 17/5036* (2013.01); *G06F 17/5077* (2013.01); *G06F 2217/82* (2013.01)

(58) Field of Classification Search
CPC ............. G06F 17/5009; G06F 17/5022; G06F 17/5027; G06F 17/5031; G06F 17/5037; G06F 2217/82; G06F 17/5036; G06F 2217/12; G06F 17/5068; G06F 17/5077; G03F 7/705
USPC ................................................ 716/106, 115
See application file for complete search history.

(56) References Cited

U.S. PATENT DOCUMENTS

| | | | | |
|---|---|---|---|---|
| 2006/0047494 A1* | 3/2006 | Tamura | ............... | G06F 17/5036 703/19 |
| 2008/0137789 A1* | 6/2008 | Cranford | ................. | H04L 7/042 375/354 |
| 2009/0112550 A1* | 4/2009 | Aikawa | ............... | G06F 17/5036 703/14 |

(Continued)

FOREIGN PATENT DOCUMENTS

| | | |
|---|---|---|
| JP | 2003-216676 | 7/2003 |
| JP | 2004-184301 | 7/2004 |
| JP | 2005-107870 | 4/2005 |

*Primary Examiner* — Paul Dinh
(74) *Attorney, Agent, or Firm* — Staas & Halsey LLP

(57) ABSTRACT

An information processing device includes a memory; and one or more processors which are coupled to the memory and configured to performs a process including verifying a quality of a signal waveform that is propagated through focused wiring on a substrate, and storing information which is used for the verification of the quality of the signal waveform, and wherein the verifying includes generating analysis models of a plurality of respective combinations of variations in a plurality of kinds of elements which have an influence on the quality of the signal waveform; calculating impulse-response-waveforms of the plurality of respective combinations using the generated analysis models; calculating the noise amount of the plurality of respective combinations based on the calculated impulse-response-waveforms; selecting a combination, in which the calculated noise amount is the largest, as a worst case in the plurality of combinations; and performing signal waveform-transition-analysis on the selected worst case.

17 Claims, 13 Drawing Sheets

(56) References Cited

U.S. PATENT DOCUMENTS

2010/0250224 A1\* 9/2010 Iguchi ................. G06F 17/5036
703/15

\* cited by examiner

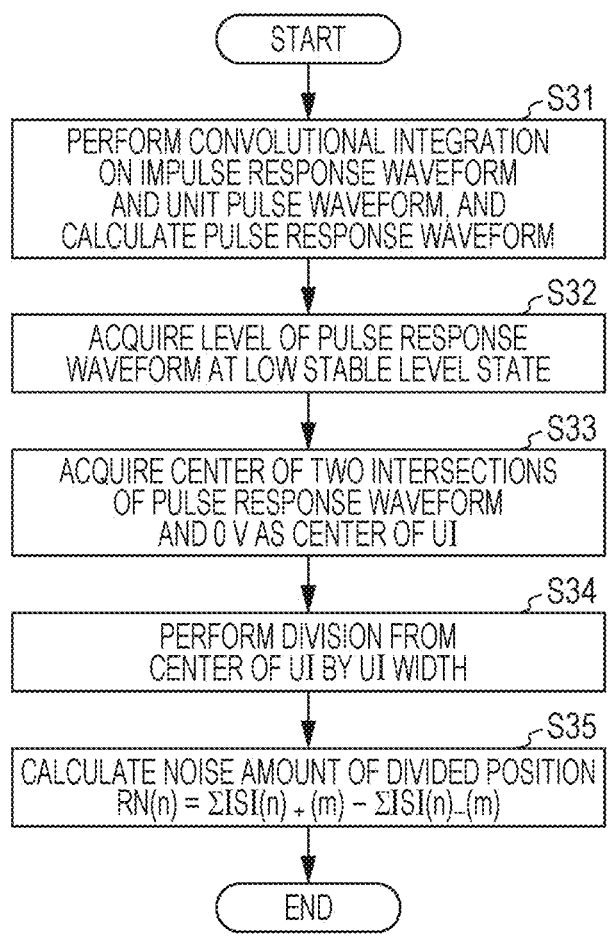

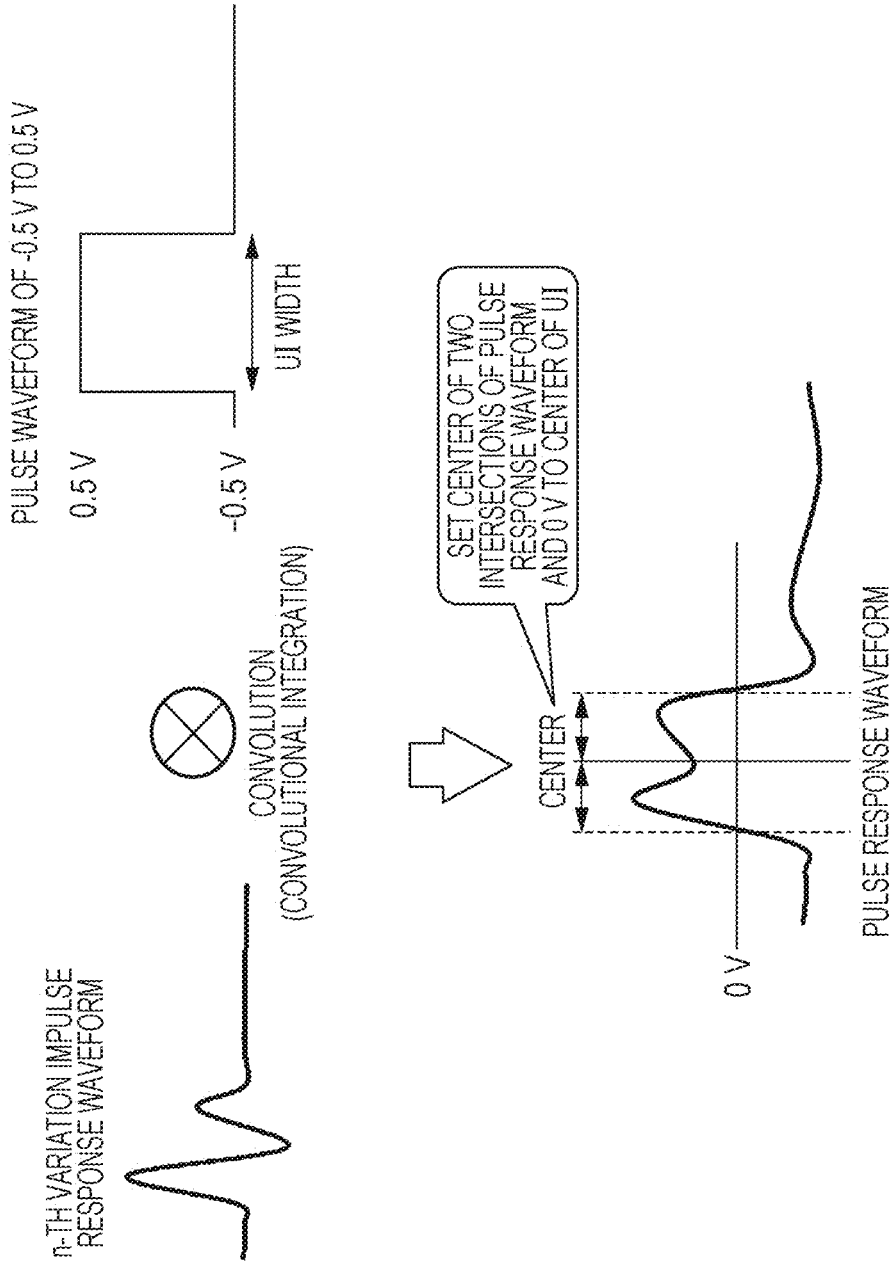

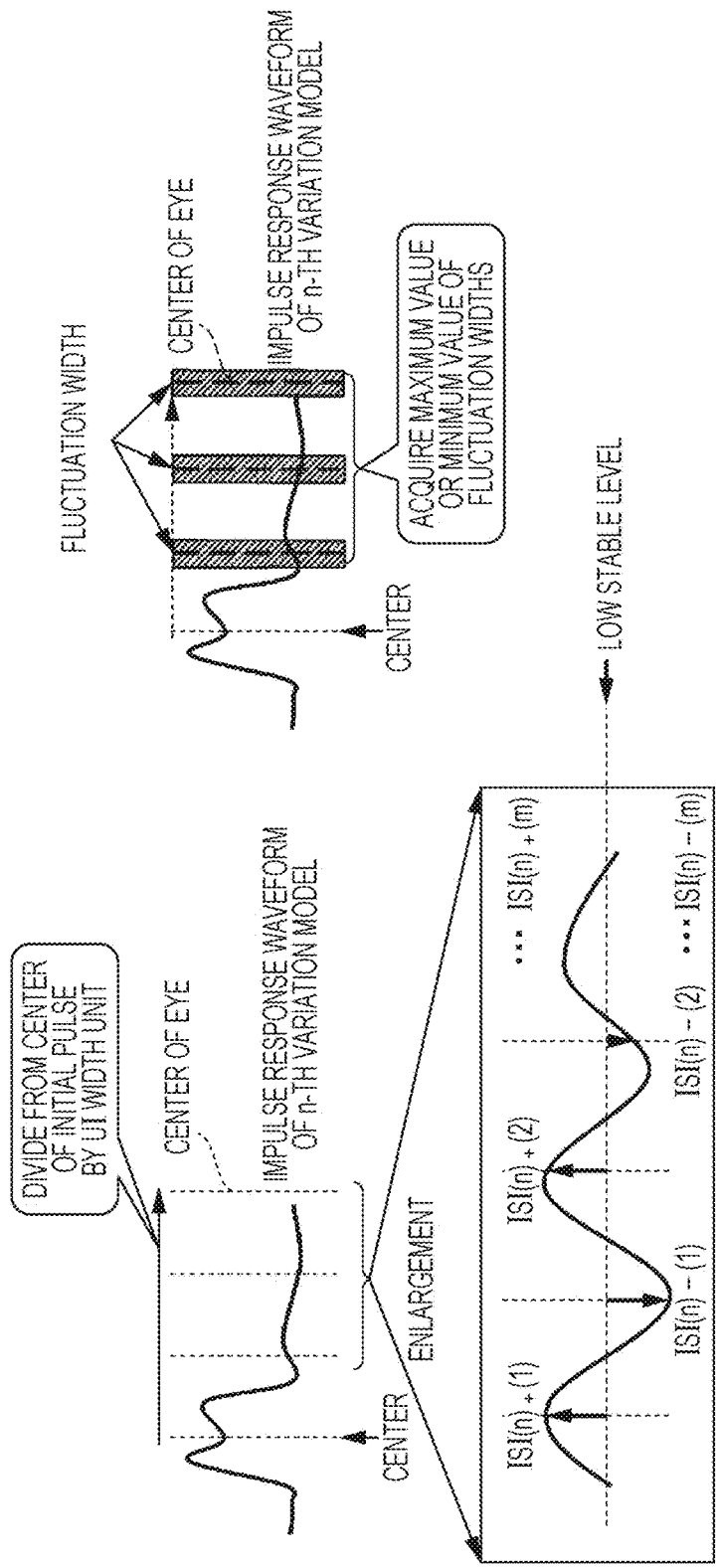

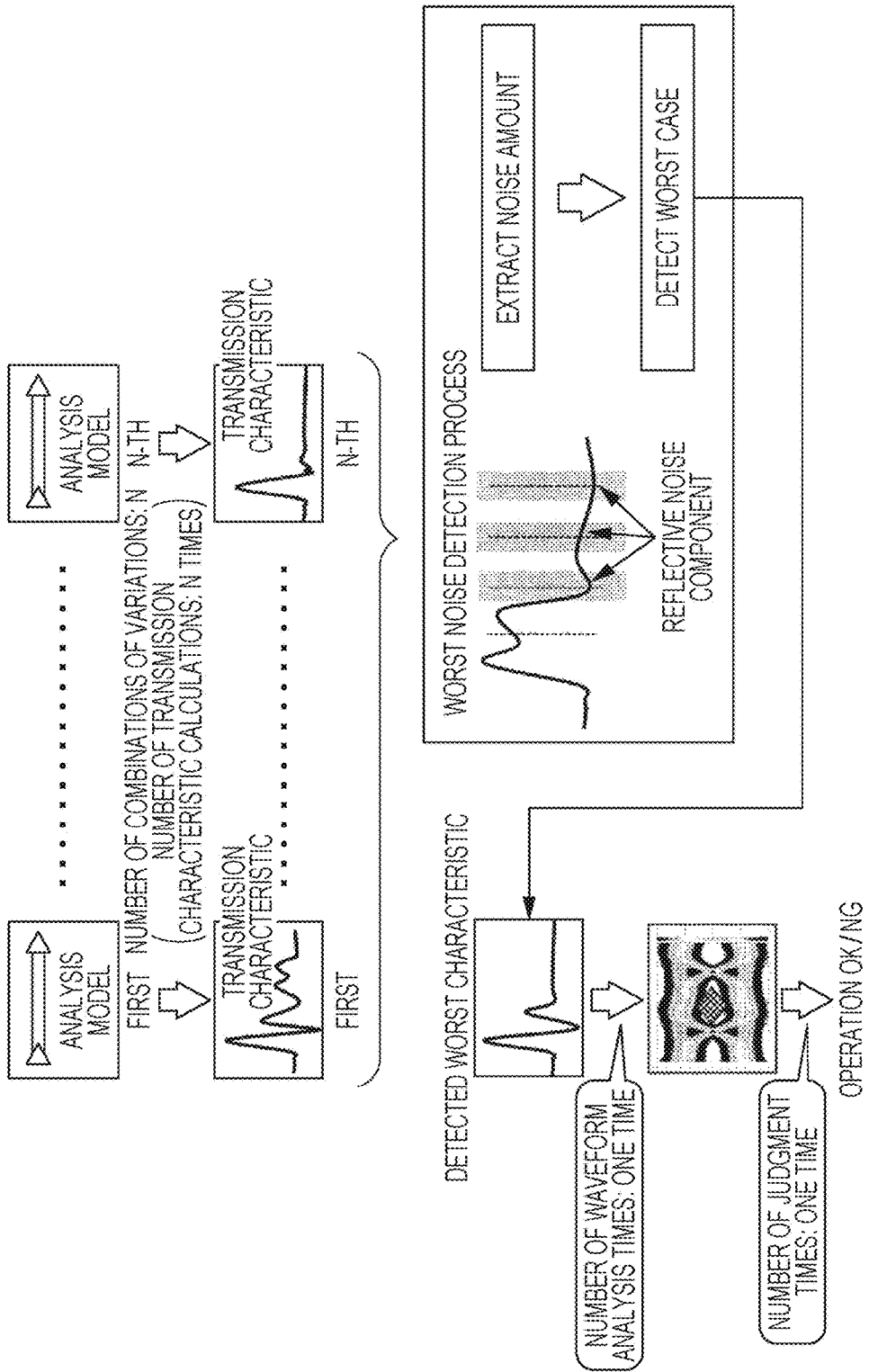

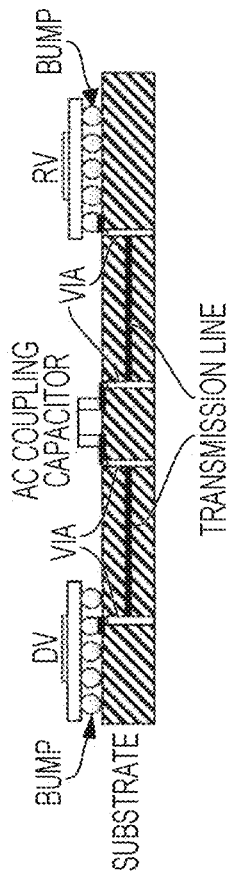
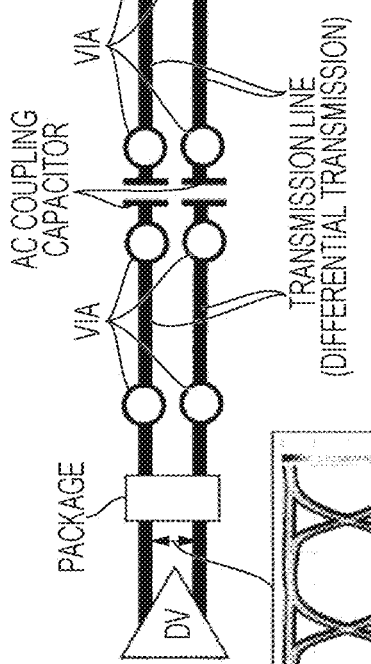
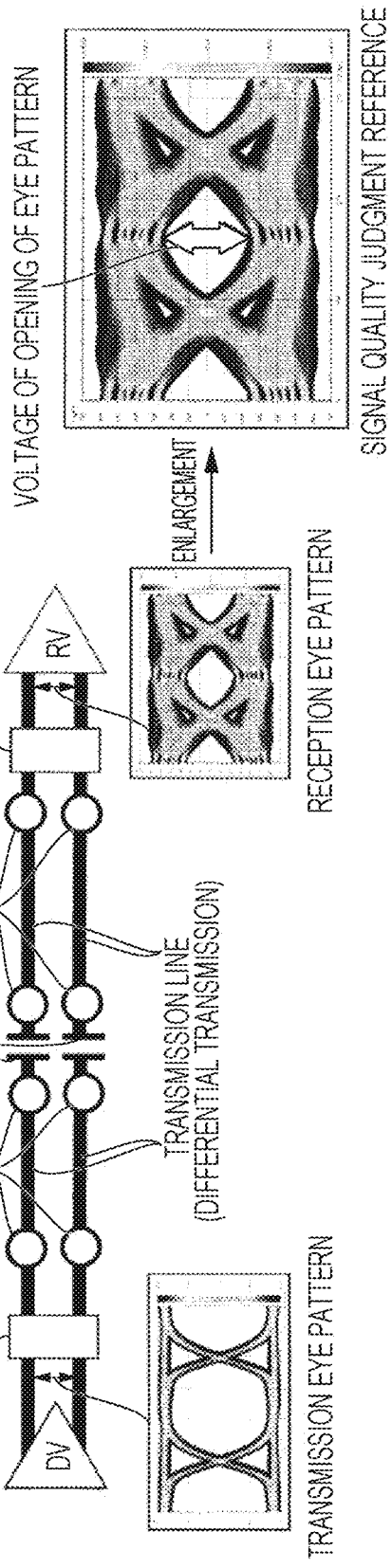

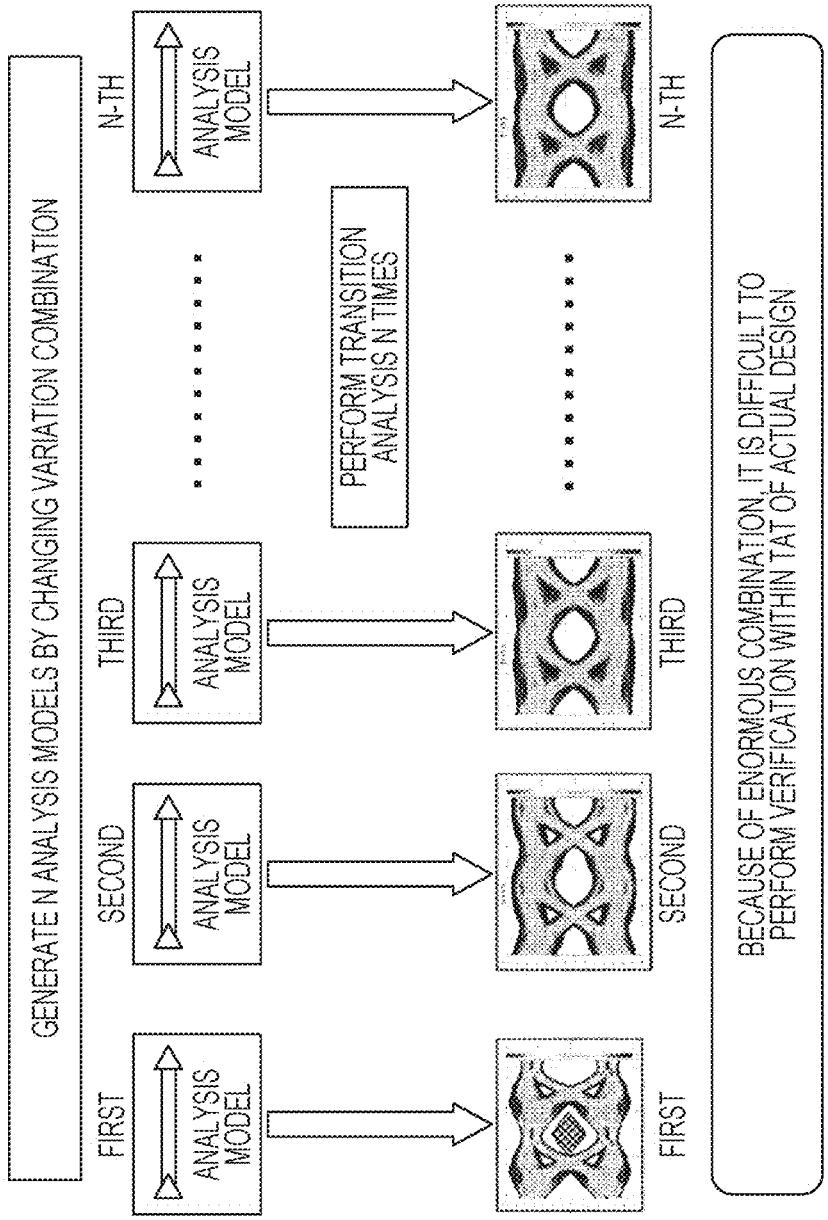

FIG. 13

| VARIATION FACTOR | EXAMPLE OF COMBINATION |
|---|---|
| CHARACTERISTIC OF DRIVER ELEMENT (DV) | THREE CASES OF Typ, Min, AND Max |
| CHARACTERISTIC OF RECEIVER ELEMENT (RV) | THREE CASES OF Typ, Min, AND Max |
| CHARACTERISTIC OF PACKAGE | THREE CASES OF Typ, Min, AND Max |
| LINE WIDTH OF TRANSMISSION LINE | THREE CASES OF Typ, Min, AND Max |
| RELATIVE PERMITTIVITY OF SUBSTRATE MATERIAL | 10 CASES |
| | TOTAL 3 × 3 × 3 × 3 × 10 = 810 CASES |

INFORMATION PROCESSING DEVICE AND WAVEFORM VERIFICATION METHOD

CROSS-REFERENCE TO RELATED APPLICATION

This application is based upon and claims the benefit of priority of the prior Japanese Patent Application No. 2015-098819, filed on May 14, 2015, the entire contents of which are incorporated herein by reference.

FIELD

The embodiment discussed herein is related to an information processing device and a waveform verification method.

BACKGROUND

In recent years, with high data transmission speed desired for various electronic apparatuses, high-speed serial transmission, such as Peripheral Component Interconnect (PCI)-Express or Universal Serial Bus (USB) 3.0, is widely spread. In the high-speed serial transmission, in order to transmit a signal by high speed, a subsequent signal is changed and transmitted before the level of the signal becomes stable. For this reason, even in a digital circuit, a signal to be transmitted behaves as an analog signal.

Factors, which cause the quality of a signal (signal waveform) to be transmitted to be deteriorated, include transmission loss in which the signal to be transmitted is attenuated, reflective noise which is generated in a position in which impedance is discontinuous, and the like. In recent years, it has become possible to perform high-precision transmission waveform simulation (high-speed digital signal transmission simulation) in which the factors are taken into consideration by combining an electromagnetic field analysis tool and signal analysis.

Japanese Laid-open Patent Publication No. 2003-216676, Japanese Laid-open Patent Publication No. 2004-184301, and Japanese Laid-open Patent Publication No. 2005-107870 are examples of the related art.

In contrast, even in a case of a Printed Circuit Board (PCB) of the same design, there are production variations in elements, which are arranged on the PCB, production variations in substrates, and the like. With the refinement of an integrated circuit, such as a Large Scale Integration (LSI), and a high data transmission speed, the influence of variations in various elements on the transmission line of the PCB on a quality of a transmission signal is growing every year.

For this reason, the number of combinations of the variations to be considered when the PCB or the like is designed is enormous. However, it is difficult to control variations in an actual machine, and thus it is difficult to verify phenomena for the respective combinations of the variations in the actual machine.

Therefore, a technique of verifying the quality of a received waveform based on various variations using simulation is important. However, the number of combinations of variations to be considered is enormous, and thus it is difficult to perform verification on the whole combinations within actual design turnaround time (TAT) based on waveform analysis (simulation).

Here, under the circumstances, some combinations of variations are manually extracted from an enormous number of combinations of variations and verification is performed on the some extracted combinations. However, in such verification, verification omission is generated, and thus there is a possibility that failures occur in the actual machine due to a combination which is not extracted.

An object of the embodiment disclosed in the specification is to verify the quality of a signal waveform in a short time, even when the number of combinations of variations in a verification target is large.

SUMMARY

According to an aspect of the embodiments, an information processing device includes a memory; and one or more processors which are coupled to the memory and configured to performs a process including verifying a quality of a signal waveform that is propagated through focused wiring on a substrate, and storing information which is used for the verification of the quality of the signal waveform, and wherein the verifying includes generating analysis models of a plurality of respective combinations of variations in a plurality of kinds of elements which have an influence on the quality of the signal waveform; calculating impulse-response-waveforms of the plurality of respective combinations using the generated analysis models; calculating the noise amount of the plurality of respective combinations based on the calculated impulse-response-waveforms; selecting a combination, in which the calculated noise amount is the largest, as a worst case in the plurality of combinations; and performing signal waveform-transition-analysis on the selected worst case.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating a noise amount calculation procedure according to the embodiment;

FIG. 7 is a diagram illustrating a pulse response waveform calculation process in the noise amount calculation procedure according to the embodiment;

FIG. 8A is a diagram illustrating a first example of a pulse response waveform division process in the noise amount calculation procedure according to the embodiment, and FIG. 8B is a diagram illustrating a second example of the pulse response waveform division process in the noise amount calculation procedure according to the embodiment;

FIG. 9 is a diagram illustrating an overview of the waveform verification operation according to the embodiment;

FIG. 11A is a longitudinal sectional diagram schematically illustrating a substrate which includes a high-speed SERializer/DESerializer (SERDES) that performs high-speed serial transmission, FIG. 11B is a diagram illustrating an equivalent circuit of the high-speed SERDES illustrated in FIG. 11A and examples of a sending eye pattern and a receiving eye pattern in the high-speed SERDES, and FIG. 11C is an enlarged diagram illustrating the receiving eye pattern illustrated in FIG. 11B in order to describe a signal quality judgment reference;

FIG. 12 is a diagram illustrating examples of analysis model generation and transition analysis according to an existing technology; and FIG. 13 is a diagram illustrating examples of variation factors, which have an influence on the qualities of signal waveforms, and the number of combinations of the variations.

DESCRIPTION OF EMBODIMENTS

Figure 1:
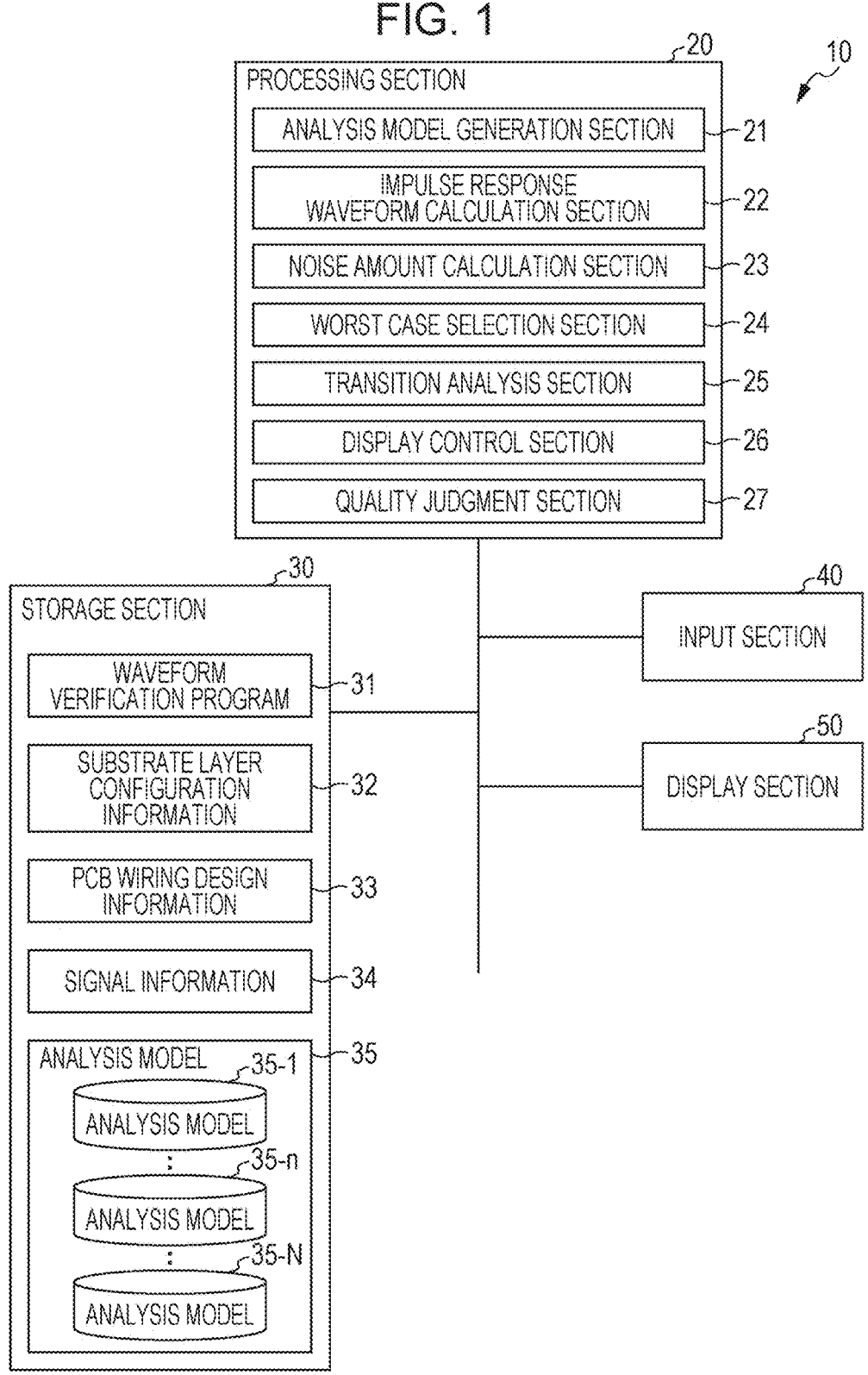
FIG. 1 is a block diagram illustrating an example of a functional configuration of an information processing device which has a waveform verification function according to an embodiment.

Hereinafter, embodiment of a waveform verification program, an information processing device, and a waveform verification method, which are disclosed in the specification, will be described in detail with reference to the accompanying drawings. However, an embodiment described below is only an example, and it is not intended to exclude application of various modified examples and technologies which are not described in the embodiment. That is, it is possible to modify and realize the embodiments in various ways without departing from the gist thereof. In addition, each drawing can include not only configuration elements illustrated in the drawing, but also other functions. Furthermore, it is possible to appropriately combine the respective embodiments without contradicting process content.

[1] Technology which is Premise of Embodiment

A technology which is the premise of the embodiment will be described with reference to FIGS. 11A to 13. First, a configuration or the like of a substrate, which is a waveform verification target in the embodiment, and includes a high-speed SERDES (serial/parallel mutual conversion circuit) that performs high-speed serial transmission, will be described with reference to FIGS. 11A to 11C. Here, FIG. 11A is a longitudinal sectional diagram schematically illustrating a substrate which includes a high-speed SERDES that performs high-speed serial transmission. FIG. 11B is a diagram illustrating an equivalent circuit of the high-speed SERDES illustrated in FIG. 11A and examples of a sending eye pattern and a receiving eye pattern in the high-speed SERDES. FIG. 11C is an enlarged diagram illustrating the receiving eye pattern illustrated in FIG. 11B in order to describe a signal quality judgment reference.

In the substrate which includes the high-speed SERDES that performs the high-speed serial transmission, for example, a driver element (DV) is connected to a receiver element (RV) through bumps, vias, transmission lines, Alternating Current (AC) coupling capacitors, and the like, as illustrated in FIG. 11A. Specifically, as illustrated in FIG. 11B, a signal is transmitted from the DV to the RV by differential transmission through a pair of vias, a pair of transmission lines, a pair of AC coupling capacitors, and the like.

Meanwhile, in FIG. 11B, a package includes the bumps, a chip substrate of the DV or the RV, and the like. The substrate is, for example, a Printed Circuit Board (PCB). The transmission lines, through which the signal is propagated, are wired within the substrate. The transmission lines are connected to various elements DV and RV which are arranged on the surface of the substrate through vias, wiring patterns, and bumps.

In the high-speed SERDES, an electrical signal is transmitted from the DV to the RV by several Gbps to several dozen Gbps. At this time, the electrical signal, which is transmitted on the substrate, is deteriorated due to transmission loss on the transmission line, reflective noise which is generated in the vias and the package, and the like. For example, as illustrated in FIG. 11B, with regard to the sending eye pattern for a signal which is acquired immediately after being sent from the DV, the receiving eye pattern which is acquired immediately before being received in the RV is deteriorated. The sending eye pattern and the receiving eye pattern are acquired by waveform analysis (transition analysis).

A user can judge the quality of a waveform as below by referring to the receiving eye pattern as illustrated in FIGS. 11B and 11C.

In the eye pattern, if a plurality of waveforms are not varied and the waveforms are superimposed on the same position (the same timing), the width of the waveforms which form an eye pattern is narrow, and the eye pattern enters a state in which a central space (the shape of the inside of the eye pattern; opening) is open widely in a vertical direction. That is, an opening voltage of the eye pattern as illustrated in FIG. 11C is high. In a case in which the opening voltage is high, it is judged that the quality of a signal waveform of a judgment target is excellent.

In contrast, in the eye pattern, a plurality of waveforms are varied and the positions (timing) of the waveforms are deviated, the width of the waveforms which form the eye pattern is thick, and the eye pattern enters a state in which the opening is closed. That is, the opening voltage of the eye pattern as illustrated in FIG. 11C is low. In a case in which the opening voltage is low, it is judged that the quality of the signal waveform of the judgment target is bad.

However, as described above, with the refinement of an integrated circuit, such as an LSI, and a high data transmission speed, influence of the variations in various elements on the transmission lines of the PCB on the quality of the transmission signal is growing every year. In actual machines, it is difficult to control the variations, and thus it is difficult to verify phenomena for respective combinations of variations. Therefore, a technology of verifying the quality of a received waveform according to various variations using simulation is important.

For example, as illustrated in FIG. 12, in a case in which the number of combinations of variations is N (N is an integer which is equal to or greater than 1), N analysis models (first to N-th analysis models) are generated by changing the combinations of variations. Furthermore, the transition analysis (waveform analysis) is performed based on analysis models which are generated for respective combinations of variations. That is, the transition analysis is performed N times, N eye patterns (first to N-th eye patterns) respectively corresponding to the N analysis models are acquired, and the quality of the signal waveform is verified. Meanwhile, FIG. 12 is a diagram illustrating examples of the analysis model generation and the transition analysis according to an existing technology.

At this time, for example, as illustrated in FIG. 13, variation factors (a plurality of kinds of elements) which affect the quality of the signal waveform include the characteristic of the driver element (DV), the characteristic of the receiver element (RV), the characteristic of the package, the line width of the transmission line, the relative permittivity of a substrate material, and the like. Here, the characteristic of the driver element is, for example, drive capability, the characteristic of the receiver element is, for example, an input resistance, the characteristic of the package is, for example, wiring resistance, impedance, or capacitance. Furthermore, in a case in which 10 cases are considered as the variations in the relative permittivity of the substrate material and 3 cases of a typical value (Typ), a minimum value (Min), and a maximum value (Max) are considered as the other variation factors, the number of combinations of variations to be considered for one net is enormous, that is, 810 cases. Meanwhile, FIG. 13 is a diagram illustrating examples of the variation factors, which affect the quality of the signal waveform, and the number of combinations of the variations.

As above, in the high-speed SERDES transmission, the number of combinations of variations to be considered is enormous. Therefore, it is difficult to perform verification using simulation for all combinations within actual design TAT. For this reason, in the present the circumstance, some combinations of variations are manually extracted from an enormous number of combinations of variations, and verification is performed on the extracted combination. However, in such verification, verification omission occurs, and thus there is a possibility that failures occur in the actual machine due to a combination which is not extracted.

[2] Overview of Embodiment

Here, in the embodiment, processes below are performed in order to verify the quality of the waveform of a signal which is propagated through focused wiring on the substrate. Here, a process (overview of a waveform verification operation), which is performed in the embodiment, will be described with reference to FIG. 9.

First, analysis models are generated for a plurality of respective of combinations of variations in a plurality of kinds of elements which affect the quality of the signal waveform. That is, as illustrated in the uppermost stage of FIG. 9, in a case in which the number of combinations of variations is N (N is an integer which is equal to or greater than 1), N analysis models (first to N-th analysis models) are generated. N is 810 in an example which is described above with reference to FIG. 13.

Impulse response waveforms (transmission characteristics) of the respective N combinations are calculated using the generated N analysis models. That is, N impulse response waveforms (first to N-th transmission characteristics) respectively corresponding to the N analysis models are calculated as illustrated in a second stage of FIG. 9.

N pieces of noise amount of the respective N combinations are calculated based on the calculated impulse response waveform. That is, as illustrated in the lower right section of FIG. 9, N pieces of noise amount of the respective N combinations of variations are calculated and extracted based on the transmission characteristics calculated for the respective combinations of variations.

Thereafter, from among the plurality of combinations, a combination in which the calculated noise amount is the largest, is selected as the worst case. That is, as illustrated in the lower right section of FIG. 9, one combination (worst characteristic) corresponding to the largest noise amount among the N pieces of noise amount is detected and selected from the N combinations.

As illustrated on the lower left stage of FIG. 9, the signal waveform transition analysis (waveform analysis) is performed once on the selected worst case (one combination; the worst characteristic), and thus the eye pattern of the worst case is acquired.

Furthermore, as illustrated in a lower left second stage of FIG. 9, the quality of the signal waveform is verified based on an opening voltage of an eye pattern of the acquired worst case, and judgment of an operation OK or an operation NG is performed once.

As above, in the embodiment, the transition analysis is not performed for the whole N combinations, the pieces of noise amount are calculated for the respective N combinations, and the transition analysis is performed on only the one worst case corresponding to the largest noise amount among the calculated N pieces of noise amount. Therefore, signal waveform quality verification is performed based on an eye pattern of the worst case.

Figure 2:
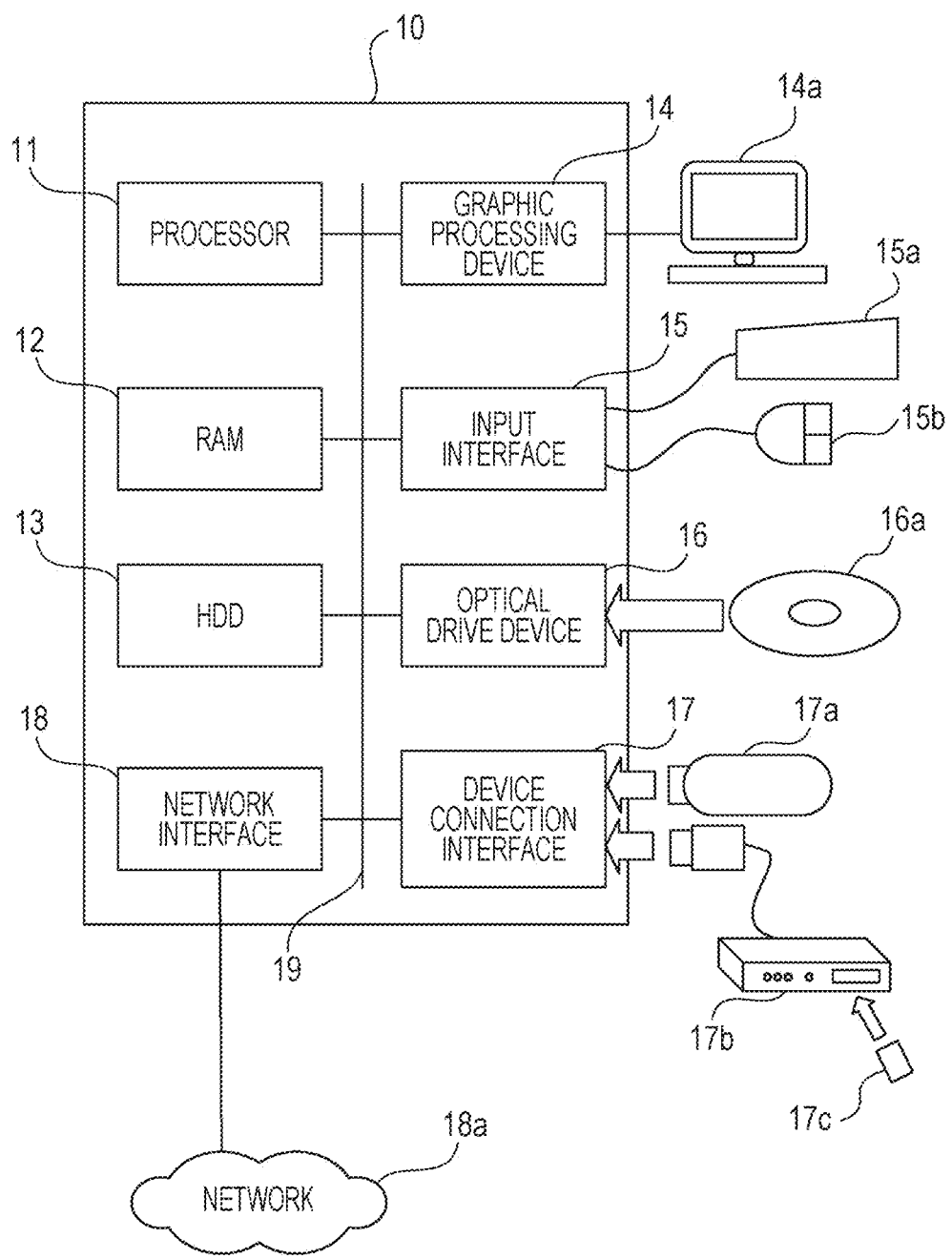
FIG. 2 is a block diagram illustrating an example of a hardware configuration of the information processing device which has the waveform verification function according to the embodiment.

[3] Hardware Configuration of Information Processing Device of Embodiment which Realizes Waveform Verification Function A hardware configuration of an information processing device (computer) 10 which realizes a waveform verification function according to the embodiment will be described with reference to FIG. 2. FIG. 2 is a block diagram illustrating an example of the hardware configuration.

The computer 10 includes, for example, a processor 11, a Random Access Memory (RAM) 12, a Hard Disk Drive (HDD) 13, a graphic processing device 14, an input interface 15, an optical drive device 16, a device connection interface 17, and a network interface 18 as configuration elements. The configuration elements 11 to 18 are configured to be able to communicate with each other through a bus 19.

The processor (processing section) 11 controls the entire computer 10. The processor 11 may be a multi-processor. The processor 11 may be one of, for example, a Central Processing Unit (CPU), a Micro Processing Unit (MPU), a Digital Signal Processor (DSP), an Application Specific Integrated Circuit (ASIC), a Programmable Logic Device (PLD), and a Field Programmable Gate Array (FPGA). In addition, the processor 11 may be acquired by combining two or more types of elements of the CPU, the MPU, the DSP, the ASIC, the PLD, and the FPGA.

The RAM (storage section) 12 is used as a main memory of the computer 10. In the RAM 12, at least a part of an Operating System (OS) program and an application program which are executed in the processor 11 is temporarily stored. In addition, in the RAM 12, various data, which is desired for a process performed by the processor 11, is stored. The application program may include the waveform verification program (refer to reference numeral 31 of FIG. 1) which is executed by the processor 11 in order to realize the waveform verification function according to the embodiment by the computer 10.

The HDD (storage section) 13 magnetically writes and reads data onto and from an installed disk. The HDD 13 is used as an auxiliary memory of the computer 10. In the HDD 13, an OS program, an application program, and various data are stored. Meanwhile, it is possible to use a semiconductor memory (Solid State Drive (SSD)), such as a flash memory, as the auxiliary memory.

A monitor 14a is connected to the graphic processing device 14. The graphic processing device 14 displays an image on a screen of the monitor 14a according to a command from the processor 11. Example of the monitor 14a include a display device using a Cathode Ray Tube (CRT), a liquid crystal display device, and the like.

A keyboard 15a and a mouse 15b are connected to the input interface 15. The input interface 15 sends signals, which are sent from the keyboard 15a and the mouse 15b, to the processor 11. Meanwhile, the mouse 15b is an example of a pointing device, and it is possible to use another pointing device. Examples of another pointing device include a touch panel, a tablet, a touch pad, a track ball, and the like.

The optical drive device 16 reads data which is recorded in an optical disk 16a using laser beams or the like. The optical disk 16a is a portable non-temporary recording medium in which data is recorded to be readable by reflection of light. Examples of the optical disk 16a include a Digital Versatile Disc (DVD), a DVD-RAM, a Compact Disc Read Only Memory (CD-ROM), a CD-Recordable (R)/ReWritable (RW), and the like.

The device connection interface 17 is a communication interface for connecting peripheral devices to the computer 10. For example, it is possible to connect a memory device 17a and a memory reader-writer 17b to the device connection interface 17. The memory device 17a is a non-temporary recording medium which has a communication function with the device connection interface 17, and is, for example, a Universal Serial Bus (USB) memory. The memory reader-writer 17b writes data onto a memory card 17c or reads data from a memory card 17c. The memory card 17c is a card-type non-temporary recording medium.

The network interface 18 is connected to a network 18a. The network interface 18 transmits or receives data to or from another computer or communication device through the network 18a.

It is possible to realize the waveform verification function, which will be described later with reference to FIG. 1 and FIGS. 3 to 5 according to the embodiment, by the computer 10 which has the above-described hardware configuration.

Meanwhile, the computer 10 realizes the waveform verification function according to the embodiment by executing a program (a waveform verification program 31 or the like which will be described later) which is recorded in, for example, a computer-readable non-temporary recording medium. It is possible to record a program, which describes the content of a process to be executed in the computer 10, in various recording mediums. For example, it is possible to store a program which is executed by the computer 10 in the HDD 13. The processor 11 loads at least a part of the program in the HDD 13 to the RAM 12, and executes the loaded programs.

In addition, it is possible to record the program which is executed by the computer 10 (processor 11) in a non-temporary portable recording medium such as the optical disk 16a, the memory device 17a, or the memory card 17c. The program which is stored in the portable recording medium is executable after being installed in the HDD 13, for example, under the control of the processor 11. In addition, it is possible for the processor 11 to execute the program by directly reading the program from the portable recording medium.

Figure 3:
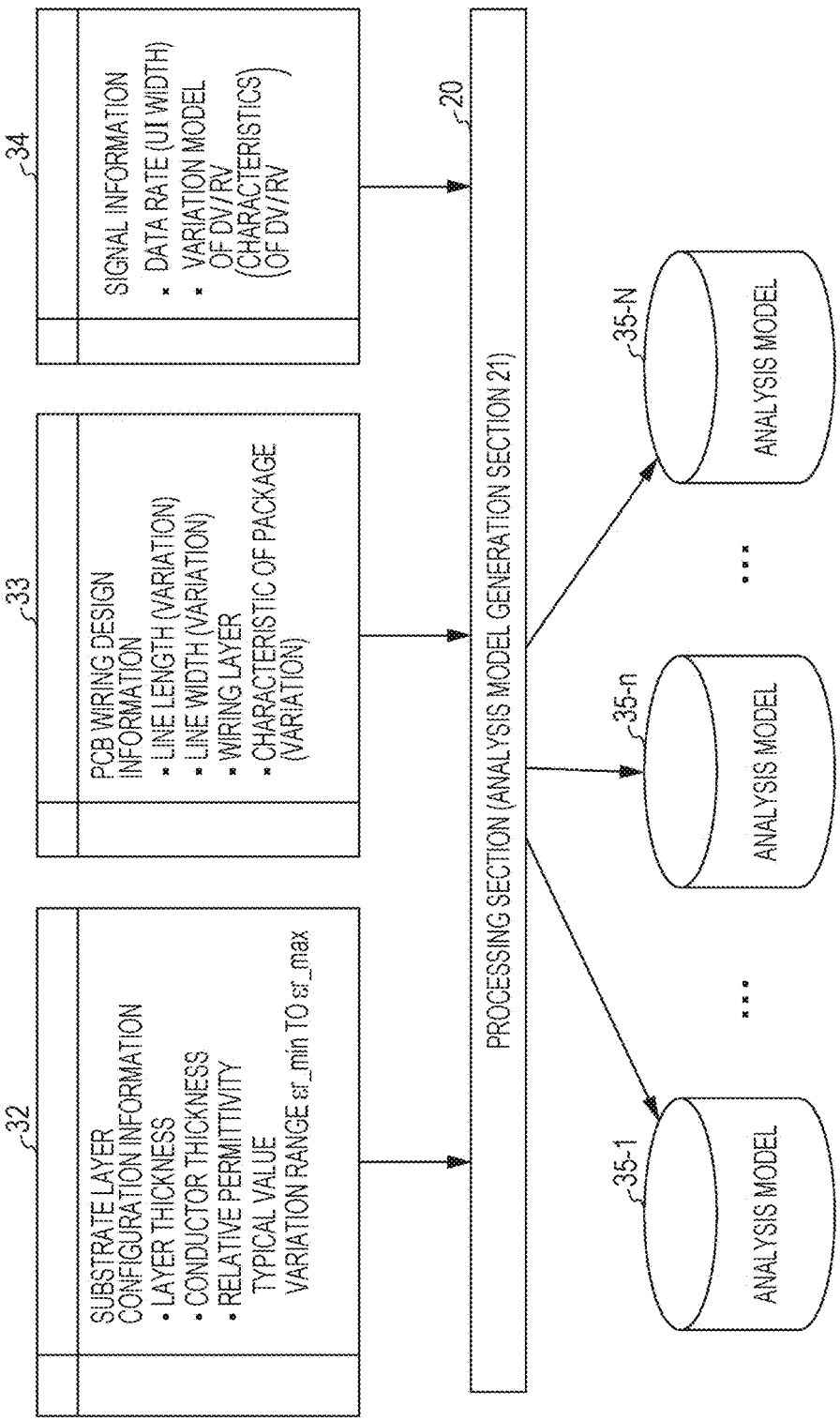
FIG. 3 is a block diagram illustrating a functional configuration pertaining to an analysis model generation function according to the embodiment.

[4] Functional Configuration of Information Processing Device which has Waveform Verification Function According to Embodiment Subsequently, a functional configuration of the information processing device (computer) 10 which has the waveform verification function according to the embodiment will be described with reference to FIGS. 1 and 3. FIG. 1 is a block diagram illustrating an example of the functional configuration and FIG. 3 is a block diagram illustrating a functional configuration pertaining to an analysis model generation function according to the embodiment.

The computer 10 has a function of verifying the quality of a signal waveform which is propagated in the focused wiring on the substrate. For this reason, the computer 10 has functions as at least a processing section 20, a storage section 30, an input section 40 and a display section 50 as illustrated in FIG. 1.

The processing section 20 is, for example, the processor 11 as illustrated in FIG. 2. The processing section 20 performs functions as an analysis model generation section 21, an impulse response waveform calculation section 22, a noise amount calculation section 23, a worst case selection section 24, a transition analysis section 25, a display control section 26, and a quality judgment section 27, which will be described later, by executing the waveform verification program 31.

The storage section 30 is, for example, the RAM 12 and the HDD 13 as illustrated in FIG. 2, and stores various pieces of information for realizing the waveform verification function, that is, various pieces of information which are used to verify the quality of the signal waveform. The various pieces of information includes substrate layer configuration information 32, PCB wiring design information 33, signal information 34, and an analysis model 35, in addition to the above-described waveform verification program 31.

The waveform verification program 31 causes the processing section 20 (processor 11) to function as the analysis model generation section 21, the impulse response waveform calculation section 22, the noise amount calculation section 23, the worst case selection section 24, the transition analysis section 25, the display control section 26, and the quality judgment section 27 as described above.

The substrate layer configuration information 32 is information relevant to a layer configuration of the substrate (PCB) which includes the focused wiring of the waveform verification target. The substrate layer configuration information 32 includes, for example, information relevant to a layer thickness, a conductor thickness, a relative permittivity, and the like as illustrated in FIG. 3. Information relevant to the relative permittivity includes information relevant to a variation range (minimum value $\epsilon\_min$ to maximum value $\epsilon\_max$) in addition to a typical value. In addition, the information relevant to the relative permittivity may include relative permittivity values (10 different values which belong to the variation range) corresponding to the 10 cases which are described above with reference to FIG. 13.

The PCB wiring design information 33 is information relevant to the design of the wiring in the substrate (PCB) which includes the focused wiring of the waveform verification target. The wiring design information 33 includes, for example, information relevant to a line length (variation), a line width (variation), a wiring layer, and a characteristic of the package (variation) of each wiring which is the waveform verification target in the substrate, as illustrated in FIG.

3. The characteristic of the package includes, for example, wiring resistance, impedance, and capacitance, as described above.

The signal information 34 is information relevant to an electrical signal which is propagated through the focused wiring of the waveform verification target on the substrate. The signal information 34 includes, for example, data rate information which includes a Unit Interval (UI) width (bit width, UI value) of a signal and information relevant to variation model information of the DV/RV, as illustrated in FIG. 3. Meanwhile, the UI width corresponds to time (inverse number of a bit rate) of one bit length of a data signal. In addition, the variation model information of the DV/RV includes information relevant to the variations in the characteristic of the DV and the characteristic of the RV which are described above with reference to FIG. 13.

The analysis model 35 is generated by the analysis model generate function (function as the analysis model generation section 21 which will be described later) of the processing section 20. The analysis model 35 includes, for example, N analysis models 35-1, . . . , 35-n, . . . , 35-N, as illustrated in FIG. 3. n is an integer of 1 to N and N is an integer which is equal to or greater than 1. Analysis models 35-1 to 35-N are generated for the first to N-th combinations of variations, respectively.

The input section 40 is, for example, the keyboard 15a and the mouse 15b as illustrated in FIG. 2, is operated by the user, and performs various instructions, such as instruction of the focused wiring which is the waveform verification target on the substrate, pertaining to the waveform verification. Meanwhile, instead of the mouse 15b, a touch panel, a tablet, a touch pad, a track ball, and the like may be used.

Figure 10A:
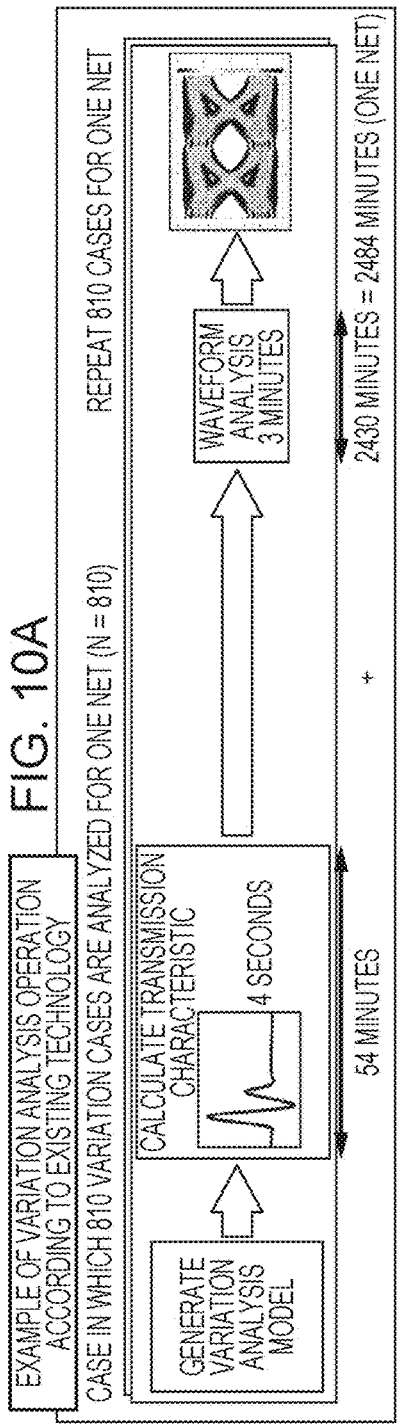
FIGS. 10A and 10B are diagrams illustrating process times that are preferable for the respective waveform verification operations of an existing technology and the embodiment through detailed comparison.
Figure 10B:
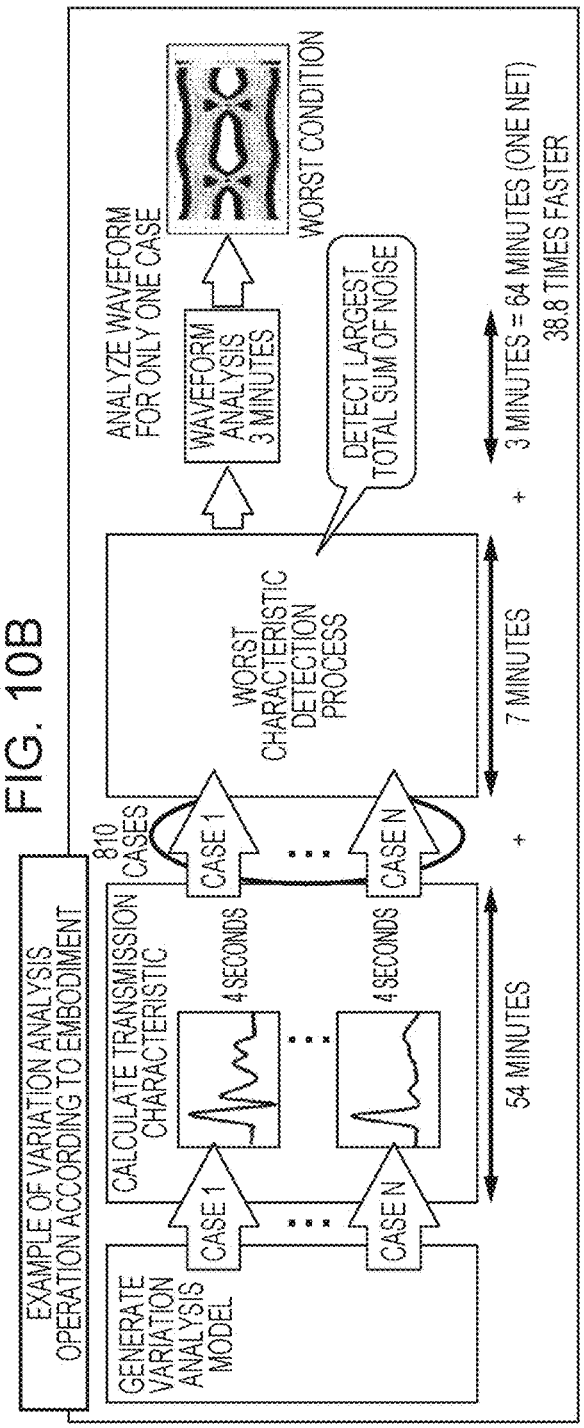

The display section 50 is, for example, the monitor 14a as illustrated in FIG. 2, and displays an eye pattern which is acquired through the waveform analysis when, for example, the user judges the quality of the signal waveform with reference to the display of the display section 50 according to the embodiment (refer to FIGS. 9, 10B, and 11C).

Subsequently, functions as the analysis model generation section 21, the impulse response waveform calculation section 22, the noise amount calculation section 23, the worst case selection section 24, the transition analysis section 25, the display control section 26, and the quality judgment section 27 which are realized by the processing section 20 (processor 11) will be described.

The analysis model generation section 21 generates the analysis models for the plurality of respective combinations of variations in the plurality of kinds of elements which affect the quality of the signal waveform. In the embodiment, the number of combinations of variations is N (N is an integer which is equal to or greater than 1), and the analysis model generation section 21 generates N analysis models (first to N-th analysis models) 35-1 to 35-N corresponding to N combinations of variations, and stores the N analysis models in the storage section 30.

The impulse response waveform calculation section 22 calculates the impulse response waveforms (transmission characteristics) for the respective N combinations using the N analysis models which are generated by the analysis model generation section 21. That is, the impulse response waveform calculation section 22 calculates the N impulse response waveforms (first to N-th transmission characteristics) corresponding to the N analysis models. An impulse response waveform calculation process will be described later in detail with reference to FIG. 5.

The noise amount calculation section 23 calculates N pieces of noise amount of the respective N combinations based on the calculated impulse response waveforms. That is, the noise amount calculation section 23 calculates and extracts N pieces of noise amount of the respective N combinations of variations based on the transmission characteristics calculated for the respective combinations of variations. A noise amount calculation process which is performed by the noise amount calculation section 23 will be described in detail later with reference to FIGS. 6 to 8.

At this time, the noise amount calculation section 23 first calculates a pulse response waveform (n-th transmission characteristic) for each combination by performing convolutional integration (convolution) of the impulse response waveform, which is calculated for each combination (n-th combination), and a pulse waveform which includes a predetermined UI width.

Furthermore, the noise amount calculation section 23 calculates the pieces of noise amount of the respective combinations using a pulse response waveform division process (first example) which will be described later with reference to FIG. 8A or a pulse response waveform division process (second example) which will be described later with reference to FIG. 8B.

In the first example of the pulse response waveform division process, the noise amount calculation section 23 calculates the noise amount for each combination based on a signal value (voltage value) in a position (the center of an eye) of a pulse response waveform which is divided for each predetermined UI width from the center of an initial pulse of the calculated pulse response waveform (refer to FIG. 8A). At this time, the noise amount calculation section 23 calculates the noise amount for each combination by adding a positive signal value in the signal value (voltage value) and subtracting a negative signal values in the signal value (voltage value).

In the second example of the pulse response waveform division process, the noise amount calculation section 23 calculates the noise amount for each combination based on the maximum signal value or the minimum signal value (voltage value) within a fluctuation width centering on the position (the center of an eye) of the pulse response waveform which is divided for each predetermined UI width from the center of the initial pulse of the calculated pulse response waveform (refer to FIG. 8B). At this time, the noise amount calculation section 23 calculates the noise amount for each combination by adding the maximum signal value (positive value) and subtracting the minimum signal value (negative value).

The worst case selection section 24 selects a combination, in which the noise amount calculated by the noise amount calculation section 23 is the maximum, as the worst case in the plurality of combinations. That is, the worst case selection section 24 detects and selects one combination (worst characteristics), which corresponds to the maximum noise amount in the N pieces of noise amount, from the N combinations.

The transition analysis section (waveform analysis section) 25 performs signal waveform transition analysis (waveform analysis) on the worst case which is selected by the worst case selection section 24. At this time, the transition analysis section 25 generates an eye pattern for the worst case by performing the signal waveform transition analysis on the worst case.

The display control section 26 displays various pieces of information on the display section 50 and provides the information to the user by controlling the display state of the display section 50. Specifically, the display control section 26 according to the embodiment controls the display state of the display section 50 such that the eye pattern for the worst case which is generated by the transition analysis section 25 is displayed on the display section 50 (refer to FIGS. 9 and 10B). Therefore, the user can judge the quality of the signal waveform (whether the operation OK or the operation NG) by sight by referring to the eye pattern which is displayed on the display section 50.

The quality judgment section 27 automatically judges the quality of the signal waveform (whether the operation OK or the operation NG) for the worst case based on the eye pattern for the worst case which is generated by the transition analysis section 25. As described above with reference to FIG. 11C, in a case in which the opening voltage is high, it is possible to judge that the quality of the signal waveform of the judgment target is excellent. In contrast, in a case in which the opening voltage is low, it is possible to judge that the quality of the signal waveform of the judgment target is bad. Here, for example, a judgment threshold is set in advance. The quality judgment section 27 is configured to judge that the quality of the signal waveform of the judgment target is bad (operation NG) in a case in which the opening voltage is lower than the judgment threshold, and configured to judge that the quality of the signal waveform of the judgment target is excellent (operation OK) in a case in which the opening voltage is equal to or higher than the judgment threshold.

Meanwhile, the quality judgment section 27 may be provided in a case in which the quality of the signal waveform is automatically judged, and may be omitted in a case in which the quality of the signal waveform is judged by only the sight of the user. In addition, configuration may be made such that one of the judgment by the sight of the user, and the automatic judgment performed by the quality judgment section 27, is selectively performed by being switched, or both judgments can be performed.

[5] Operation of Information Processing Device which has Waveform Verification Function According to Embodiment Subsequently, the waveform verification operation performed by the information processing device 10 according to the embodiment will be described in detail with reference to FIGS. 4 to 9.

[5-1] Waveform Verification Operation According to Embodiment

Figure 4:
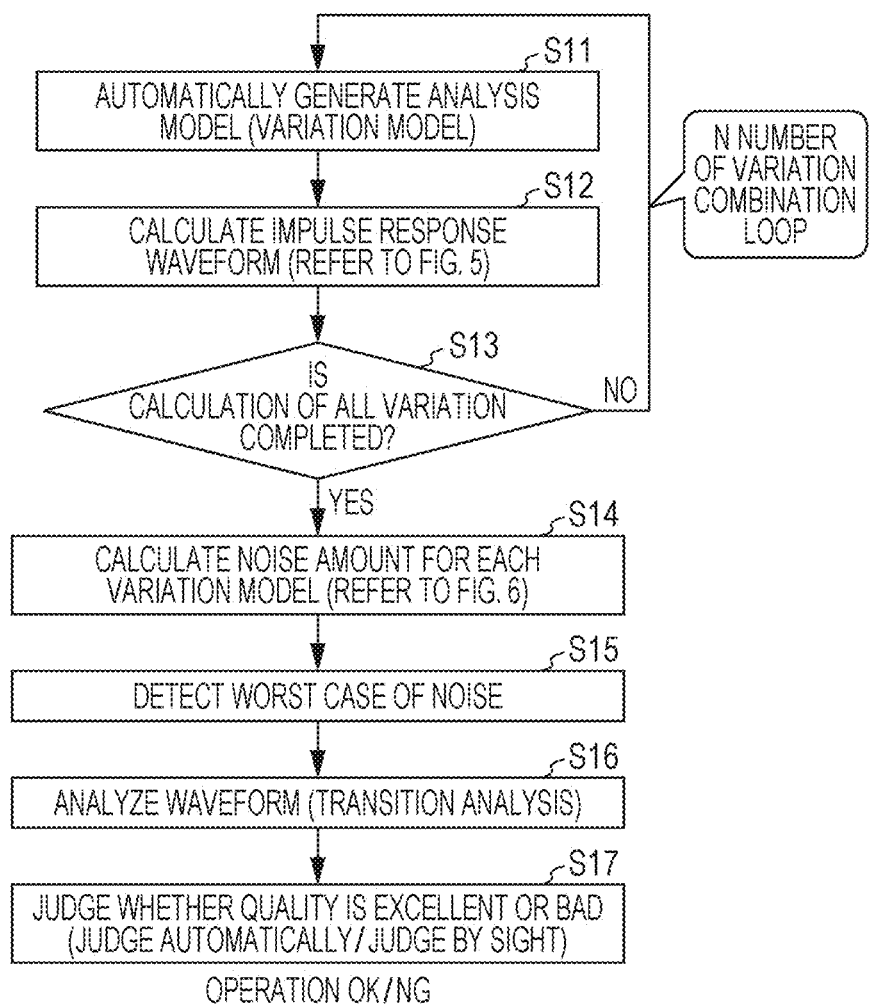
FIG. 4 is a flowchart illustrating a waveform verification operation according to the embodiment.

First, the waveform verification operation according to the embodiment will be described according to a flowchart (steps S11 to S17) illustrated in FIG. 4 with reference to FIG. 9.

In step S11, the analysis model generation section 21 generates the N analysis models (first to N-th analysis models) 35-1 to 35-N respectively corresponding to the N combinations of variations as illustrated in the uppermost stage of FIG. 9, and stores the N analysis models in the storage section 30.

Further, in step S12, the impulse response waveform calculation section 22 calculates the N impulse response waveforms (first to N-th transmission characteristics) respectively corresponding to the N analysis models as illustrated in a second stage of FIG. 9. An impulse response waveform calculation process will be described later in detail with reference to FIG. 5.

The processes in steps S11 and S12 are repeatedly performed until the processes are performed on N, that is, the whole combinations of variations (NO route in step S13 to step S11). When the processing section 20 judges that calculation for the whole combinations of variations is completed (processes in steps S11 and S12) in step S13 (YES route in step S13), the process proceeds to a process in step S14.

In step S14, the noise amount calculation section 23 calculates and extracts N pieces of noise amount of the respective N combinations of variations based on the transmission characteristics calculated for the respective combinations of variations as illustrated in the lower right section of FIG. 9. A noise amount calculation process performed by the noise amount calculation section 23 will be described later in detail with reference to FIGS. 6 to 8B. Meanwhile, the process in step S14 may be performed whenever the impulse response waveforms for the respective combinations of variations are calculated between the above-described processes in steps S12 and S13.

Subsequently, in step S15, the worst case selection section 24 detects and selects one combination (worst characteristic) corresponding to the maximum noise amount of the N pieces of noise amount calculated in step S14 as the worst case from the N combinations, as illustrated in the lower right section of FIG. 9.

Thereafter, in step S16, the transition analysis section 25 performs the signal waveform transition analysis (waveform analysis) on the worst case selected in step S15 one time, and generates an eye pattern for the worst case as illustrated in the lower left first stage of FIG. 9. Meanwhile, the transition analysis section 25 performs analysis through the convolution (convolutional integration) or SPICE analysis, calculates transition waveforms, and draws the eye pattern. Here, the SPICE is abbreviation of Simulation Program with Integrated Circuit Emphasis, and is software for simulating an analog operation of the electrical circuit.

Further, in step S17, based on the acquired opening voltage or the like of the eye pattern of the worst case, whether the quality of the signal waveform is excellent or bad is judged (automatic judgment or judgment by sight), and whether the operation OK or the operation NG is judged only one time as illustrated in a lower left second stage of FIG. 9.

At this time, in a case in which the quality of the signal waveform is judged by the sight of the user, the display control section 26 displays the eye pattern, which is generated in step S16 for the worst case, on the display section 50 in step S17. Further, the user verifies the quality of the signal waveform by sight by referring to the eye pattern which is displayed on the display section 50, and judges the operation OK or the operation NG.

In contrast, in a case in which the quality of the signal waveform is automatically judged, the quality judgment section 27 automatically judges the quality of the signal waveform for the worst case by comparing the opening voltage (potential difference) of the eye pattern, which is generated in step S16 for the worst case, with the judgment threshold, which is set in advance, in step S17. For example, the judgment threshold is set in advance and the quality judgment section 27 judges that the quality of the signal waveform of the judgment target is bad in a case in which the opening voltage is lower than the judgment threshold and judges that the quality of the signal waveform of the judgment target is excellent in a case in which the opening voltage is equal to or higher than the judgment threshold.

[5-2] Impulse Response Waveform Calculation Procedure According to Embodiment

Figure 5:
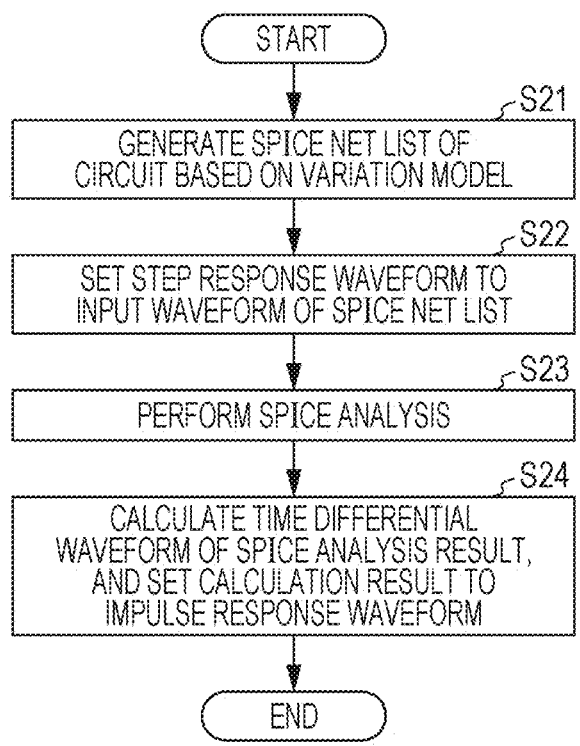
FIG. 5 is a flowchart illustrating an impulse response waveform calculation procedure according to the embodiment.

Subsequently, the impulse response waveform calculation procedure (procedure of a process which is performed by the impulse response waveform calculation section 22 in step S12 of FIG. 4) according to the embodiment will be described according to flowchart (steps S21 to S24) illustrated in FIG. 5.

In step S21, the impulse response waveform calculation section 22 generates a SPICE net list of the electrical circuit which is the verification target from an n-th variation model (analysis model).

Thereafter, in step S22, the impulse response waveform calculation section 22 sets a step response waveform to an input waveform of the SPICE net list, and performs the SPICE analysis in step S23.

Further, in step S24, the impulse response waveform calculation section 22 calculates a time differential waveform, which is the result of the SPICE analysis, in step S23, and outputs the result of the calculation as an n-th impulse response waveform (transmission characteristic).

[5-3] Noise Amount Calculation Procedure According to Embodiment

Subsequently, the noise amount calculation procedure (procedure of the process performed by the noise amount calculation section 23 in step S14 of FIG. 4) according to the embodiment will be described with reference to FIGS. 7, 8A, and 8B according to the flowchart (step S31 to S35) illustrated in FIG. 6. The noise amount calculation process illustrated in FIG. 6 is performed for the respective combinations of variations, that is, the first to N-th combinations of variations (variation models). Meanwhile, FIG. 7 is a diagram illustrating a pulse response waveform calculation process in the noise amount calculation procedure according to the embodiment. In addition, FIGS. 8A and 8B are diagrams respectively illustrating a first example and a second example of the pulse response waveform division process in the noise amount calculation procedure according to the embodiment.

In step S31, the noise amount calculation section 23 calculates a pulse response waveform (n-th transmission characteristic) for the n-th combination by performing the convolutional integration of the impulse response waveform, which is calculated for the n-th combination of variations, and a unit pulse waveform, which has the predetermined UI width, as illustrated in FIG. 7.

Further, in step S32, the noise amount calculation section 23 acquires a level (LOW stable level; refer to FIG. 8B) of a stable state at a LOW level of the pulse response waveform, which is calculated in step S31. In addition, in step S33, the noise amount calculation section 23 acquires the center of two intersections of initial pulse response waveform and 0 V as the center of the UI, as illustrated in a lower stage of FIG. 7.

Thereafter, in step S34, the noise amount calculation section 23 performs the pulse response waveform division process (first example) illustrated in FIG. 8A or the pulse response waveform division process (second example) illustrated in FIG. 8B.

In the first example of the pulse response waveform division process, the noise amount calculation section 23 divides the pulse response waveform for each predetermined UI width as illustrated by a dotted line in FIG. 8A from the center of the initial pulse of the pulse response waveform which is calculated in step S33. The position (position indicated by the dotted line) of the pulse response waveform acquired through the division as above is a position corresponding to the center of an eye. Here, the center of the eye is a central position of the eye pattern, and is equivalent to a position corresponding to the opening voltage of the eye pattern illustrated in FIG. 11C.

Further, in step S35, the noise amount calculation section 23 calculates noise amount RN(n) for the n-th combination of variations as follows based on the signal value (voltage value) in the position (the center of an eye) acquired through division performed on the pulse response waveform.

Here, as illustrated in a lower stage of FIG. 8A, signal values (refer to solid arrows) of a case, in which the symbols of the signal values are positive for the LOW stable level acquired in step S32, are sequentially defined as $ISI(n)_+(1)$, $ISI(n)_+(2), \ldots, ISI(n)_+(m), \ldots, ISI(n)_+(M)$. In the same manner, signal values (refer to dotted-line arrows) of a case, in which the symbols of the signal values are negative for the LOW stable level, are sequentially defined as $ISI(n)_-(1)$, $ISI(n)_-(2), \ldots, ISI(n)_-(m), \ldots, ISI(n)_-(M)$. M is an integer which is equal to or greater than 1, and m is an integer of 1 to M.

At this time, the noise amount calculation section 23 calculates the noise amount of the n-th variation model according to, for example, Equation (1) below.

$$RN(n) = \Sigma_m ISI(n)_+(m) - \Sigma_m ISI(n)_-(m) \quad (1)$$

In Equation (1), $\Sigma_m ISI(n)_+(m) = ISI(n)_+(1) + ISI(n)_+(2) + \ldots + ISI(n)_+(m) + \ldots + ISI(n)_+(M)$, and $\Sigma_m ISI(n)_-(m) = ISI(n)_-(1) + ISI(n)_-(2) + \ldots + ISI(n)_-(m) + \ldots + ISI(n)_-(M)$.

Further, the worst case selection section 24 acquires a case number Q (Q is an integer of 1 to N; a case number of the worst case) corresponding to the maximum of the N pieces of noise amount RN(1) to RN(N) which are acquired in the first to N-th variation models. That is, n, which realizes $_{max}(RN(1), \ldots, RN(N)) = RN(n)$, is acquired as the above-described case number Q. Thereafter, the transition analysis section 25 performs the signal waveform transition analysis on the variation model (combination of variations; the worst case) of the case number Q (Q-th variation model), and generates the eye pattern of the worst case.

In the first example of the pulse response waveform division process, as described above, the noise amount is calculated based on the signal value in a position acquired through division performed on the pulse response waveform. In contrast, in the second example of the pulse response waveform division process, the noise amount calculation section 23 sets fluctuation widths (refer to areas indicated by oblique lines) centering on the positions (refer to broken lines) acquired through division like the first example (step S34), as illustrated in FIG. 8B. Further, the noise amount calculation section 23 may calculate the noise amount RN(n) according to Equation (1) using the maximum signal value (positive value) within the fluctuation width as $ISI(n)+(m)$ of Equation (1) or using the minimum signal value (negative value) within the fluctuation width as $ISI(n)_-(m)$ of Equation (1) (step S35).

[6] Advantage of Embodiment

As above, according to the embodiment, the quality of the signal waveform verification is performed based on the eye pattern of the worst case as illustrated in FIG. 9. Therefore, even when the number of combinations of variations in the verification target is large, it is possible to verify the quality of the signal waveform in short time. In addition, it is possible to securely suppress the verification omission from occurring, and thus it is possible to securely suppress failures from occurring in the actual machine due to the combination in which verification is omitted.

Here, description will be performed by comparing process times, which are desired for waveform verification operations according to the existing technology and the embodiment, in detail with reference to FIGS. 10A and 10B. Here, similarly to the example described above with reference to FIG. 13, the process time which is desired to analyze 810 combinations of variations for one net will be described.

In an example of the existing technology illustrated in FIG. 10A, the process time, which is desired to calculate 810 transmission characteristics (impulse response waveforms) based on the respective analysis models after the 810 variation analysis models are generated, is "time of 4 seconds which is desired to calculate one transmission characteristic"×810=54 minutes. Further, the process time which is desired for the waveform analysis of the 810 cases based on the 810 transmission characteristics (impulse response waveforms) is "time of 3 minutes which is desired to perform waveform analysis on one case"×810=2430 minutes. Therefore, the process time which is desired for the existing technology is 54+2430=2484 minutes.

As illustrated in FIG. 10B, in the example of the waveform verification operation according to the embodiment, the process time, which is desired to calculate 810 transmission characteristics (impulse response waveforms) based on the respective analysis models after the 810 variation analysis models (cases 1 to N) are generated is "time of 4 minutes which is desired to calculate one transmission characteristic"×810=54 minutes. Further, the process time, which is desired for the worst characteristic detection process performed by the noise amount calculation section 23 and the worst case selection section 24, is approximately 7 minutes, and time which is desired for the waveform analysis of the worst case is 3 minutes. Therefore, the process time which is desired for the waveform verification operation according to the embodiment is 54+7+3=64 minutes. According to the embodiment, it is possible to perform the waveform verification at a speed which is approximately 38.8 times faster than the existing technology.

[7] Others

Hereinabove, although preferable embodiments have been described in detail, the embodiments are not limited to the relevant specific embodiment, and various modifications and changes are possible without departing from the gist of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a waveform verification program for causing a memory and one or more processors, which are coupled to the memory and configured to verify a quality of a signal waveform that is propagated through focused wiring on a substrate, to perform a process comprising:

generating analysis models of a plurality of respective combinations of variations in a plurality of kinds of elements which have an influence on the quality of the signal waveform;

calculating impulse-response-waveforms of the plurality of respective combinations using the generated analysis models;

calculating a noise amount of the plurality of respective combinations based on the calculated impulse-response-waveforms;

selecting a combination, in which the calculated noise amount is the largest, as a worst case in the plurality of respective combinations; and performing signal waveform-transition-analysis on the selected worst case, wherein the signal waveform-transition-analysis on the selected worst case is reflected in a design of the focused wiring on the substrate, and wherein, when the noise amount is calculated, the waveform verification program causes the one or more processors to perform a process including calculating pulse response waveforms of the plurality of respective combinations by performing convolutional integration of the calculated impulse-response-waveforms of the plurality of respective combinations and a pulse waveform which has a predetermined Unit Interval (UI) width; and calculating pieces of the noise amount of the plurality of respective combinations based on signal values in positions of the pulse response waveforms acquired through division performed at each predetermined UI width from a center of an initial pulse of the calculated pulse response waveforms.

2. The computer-readable recording medium according to claim 1, wherein the waveform verification program causes the one or more processors to perform a process including calculating the noise amount of the respective combinations by adding positive signal values in the signal values and subtracting negative signal values in the signal values.

3. The computer-readable recording medium according to claim 1, wherein, when the noise amount is calculated, the waveform verification program causes the one or more processors to perform a process including calculating the pulse response waveforms of the respective combinations by performing convolutional integration of the calculated impulse-response-waveforms of the respective combinations and a pulse waveform which has a predetermined Unit Interval (UI) width; and calculating pieces of noise amount of the respective combinations based on a maximum signal value or a minimum signal value within a fluctuation width centering on positions of the pulse response waveforms acquired through division performed at each predetermined UI width from a center of an initial pulse of the calculated pulse response waveforms.

4. The computer-readable recording medium according to claim 3, wherein the waveform verification program causes the one or more processors to perform a process including calculating the pieces of noise amount of the respective combinations by adding the maximum signal value and subtracting the minimum signal value.

5. The computer-readable recording medium according to claim 1, wherein the waveform verification program causes the one or more processors to perform a process including generating an eye pattern by performing the signal waveform-transition-analysis on the worst case; and
judging the quality of the signal waveform based on the generated eye pattern.

6. The computer-readable recording medium according to claim 5,
wherein the waveform verification program causes the one or more processors to perform a process including
when the quality of the signal waveform is judged, performing judgment by comparing an opening voltage of the eye pattern of the worst case with a threshold.

7. An information processing device, comprising:
a memory; and
one or more processors which are coupled to the memory and configured to performs a process including
verifying a quality of a signal waveform that is propagated through focused wiring on a substrate, and
storing information which is used for the verification of the quality of the signal waveform, and
wherein the verifying includes
generating analysis models of a plurality of respective combinations of variations in a plurality of kinds of elements which have an influence on the quality of the signal waveform;
calculating impulse-response-waveforms of the plurality of respective combinations using the generated analysis models;
calculating a noise amount of the plurality of respective combinations based on the calculated impulse-response-waveforms;
selecting a combination, in which the calculated noise amount is the largest, as a worst case in the plurality of respective combinations; and
performing signal waveform-transition-analysis on the selected worst case,
wherein the signal waveform-transition-analysis on the selected worst case is reflected in a design of the focused wiring on the substrate,
wherein, when the noise amount is calculated, the verifying includes
calculating pulse response waveforms of the plurality of respective combinations by performing convolutional integration of the calculated impulse-response-waveforms of the plurality of respective combinations and a pulse waveform which has a predetermined Unit Interval (UI) width; and
calculating pieces of noise amount of the plurality of respective combinations based on signal values in positions of the pulse response waveforms acquired through division performed at each predetermined UI width from a center of an initial pulse of the calculated pulse response waveforms.

8. The information processing device according to claim 7,
wherein the verifying includes
calculating the pieces of noise amount of the respective combinations by adding positive signal values in the signal values and subtracting negative signal values in the signal values.

9. The information processing device according to claim 7,
wherein, when the noise amount is calculated, the verifying includes
calculating the pulse response waveforms of the respective combinations by performing convolutional integration of the calculated impulse-response-waveforms of the respective combinations and a pulse waveform which has a predetermined Unit Interval (UI) width; and
calculating pieces of noise amount of the respective combinations based on a maximum signal value or a minimum signal value within a fluctuation width centering on positions of the pulse response waveforms acquired through division performed at each predetermined UI width from a center of an initial pulse of the calculated pulse response waveforms.

10. The information processing device according to claim 9,
wherein the verifying includes
calculating the pieces of noise amount of the respective combinations by adding the maximum signal value and subtracting the minimum signal value.

11. The information processing device according to claim 7,
wherein the verifying includes,
generating an eye pattern by performing the signal waveform-transition-analysis on the worst case; and
judging the quality of the signal waveform based on the generated eye pattern.

12. The information processing device according to claim 11,
wherein the verifying includes
when the quality of the signal waveform is judged, performing judgment by comparing an opening voltage of the eye pattern of the worst case with a threshold.

13. A waveform verification method for verifying a quality of a signal waveform that is propagated through focused wiring on a substrate by a memory and one or more processors which are coupled to the memory, the waveform verification method comprising:
generating analysis models of a plurality of respective combinations of variations in a plurality of kinds of elements which have an influence on the quality of the signal waveform;
calculating impulse-response-waveforms of the plurality of respective combinations using the generated analysis models;
calculating a noise amount of the plurality of respective combinations based on the calculated impulse-response-waveforms;
selecting a combination, in which the calculated noise amount is the largest, as a worst case in the plurality of respective combinations;
performing signal waveform-transition-analysis on the selected worst case; and
when the noise amount is calculated
calculating pulse response waveforms of the plurality of respective combinations by performing convolutional integration of the calculated impulse-response-waveforms of the plurality of respective combinations and a pulse waveform which has a predetermined Unit Interval (UI) width; and
calculating the pieces of noise amount of the plurality of respective combinations based on signal values in positions of the pulse response waveforms acquired through division performed at each predetermined UI width from a center of an initial pulse of the calculated pulse response waveforms,
wherein the signal waveform-transition-analysis on the selected worst case is reflected in a design of the focused wiring on the substrate.

14. The waveform verification method according to claim 13, further comprising:

calculating the pieces of noise amount of the respective combinations by adding positive signal values in the signal values, and subtracting negative signal values in the signal values.

15. The waveform verification method according to claim 13, further comprising:

when the noise amount is calculated calculating the pulse response waveforms of the respective combinations by performing convolutional integration of the calculated impulse-response-waveforms of the respective combinations and a pulse waveform which has a predetermined Unit Interval (UI) width; and calculating the pieces of noise amount of the respective combinations based on a maximum signal value or a minimum signal value within a fluctuation width centering on positions of the pulse response waveforms acquired through division performed at each predetermined UI width from a center of an initial pulse of the calculated pulse response waveforms.

16. The waveform verification method according to claim 15, further comprising:

calculating the pieces of noise amount of the respective combinations by adding the maximum signal value and subtracting the minimum signal value.

17. The waveform verification method according to claim 13, further comprising:

generating an eye pattern by performing the signal waveform-transition-analysis on the worst case; and judging the quality of the signal waveform based on the generated eye pattern.

* * * * *